United States Patent [19] [11] 3,905,703
Matsumoto [45] Sept. 16, 1975

[54] METHOD FOR ADJUSTING AN OPTICAL SYSTEM IN AN APPARATUS FOR RECORDING SIGNAL LIGHT BEAMS ON A PHOTOSENSITIVE BODY

[75] Inventor: Kazuya Matsumoto, Yokohama, Japan

[73] Assignee: Canon Kabushiki Kaisha, Tokyo, Japan

[22] Filed: June 22, 1973

[21] Appl. No.: 372,761

[30] Foreign Application Priority Data
June 30, 1972 Japan............................. 47-65741

[52] U.S. Cl............................. 356/106 R; 356/110
[51] Int. Cl.² ........................................ G01B 9/02
[58] Field of Search......... 356/106 R, 110, 125, 126

[56] References Cited
UNITED STATES PATENTS
3,218,916  11/1965  Saunders............................. 356/113
3,506,361  4/1970  Erickson........................ 356/106 R
3,617,130  11/1971  Kelley................................ 356/107

OTHER PUBLICATIONS
Francon et al. Polarization Iterferometers, 1971, Wiley–Interscience, London, pp. 19–28.

Primary Examiner—Ronald L. Wibert
Assistant Examiner—Matthew W. Koren
Attorney, Agent, or Firm—Fitzpatrick, Cella, Harper & Scinto

[57] ABSTRACT

A method for effecting adjustment of the focus and adjustment of the position of a condensing optical system by the steps of condensing coherent signal light beams on a substantially moving photosensitive body making use of the condensing optical system, having a reflected wave surface, which passes through again the condensing optical system from a condensing point, interfered with a reference wave surface coherent with the reflected wave surface, and observing interference fringes produced by the interference thereof.

21 Claims, 15 Drawing Figures

FIG. 1   FIG. 2   FIG. 3
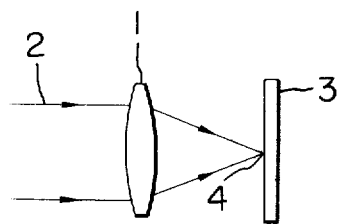
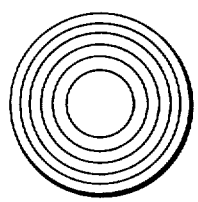
FIG. 4a
FIG. 5
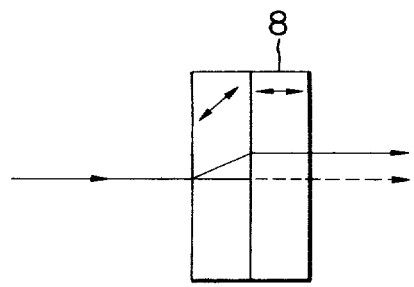
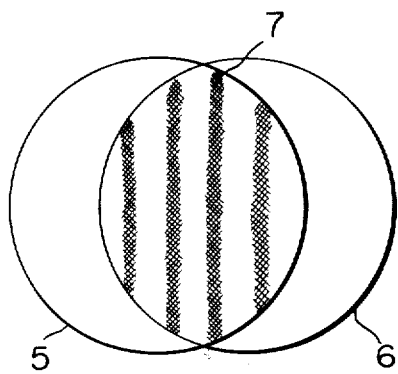
FIG. 4b
FIG. 7
FIG. 6
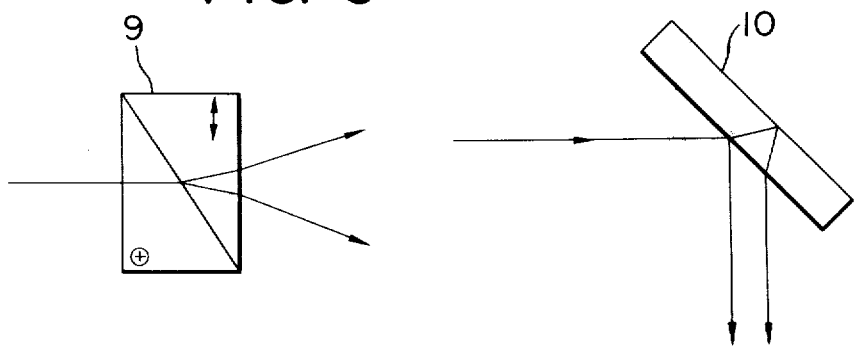

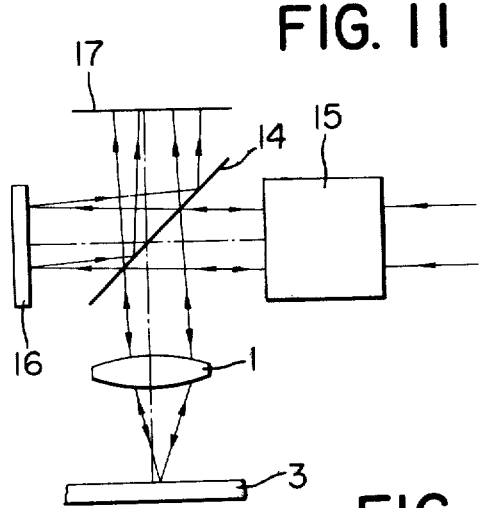
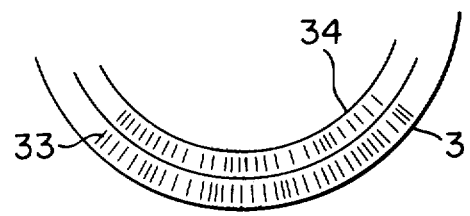
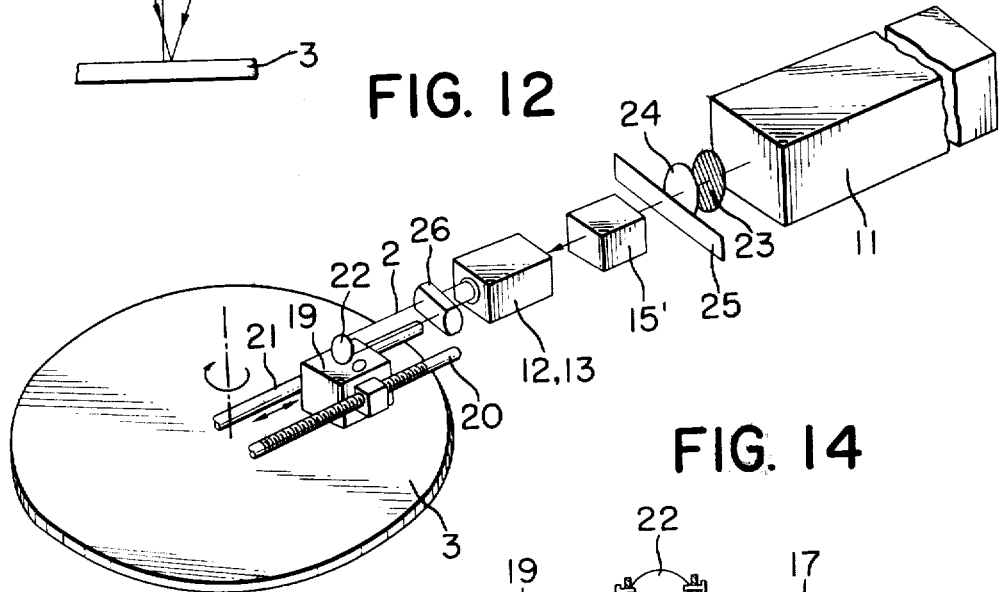
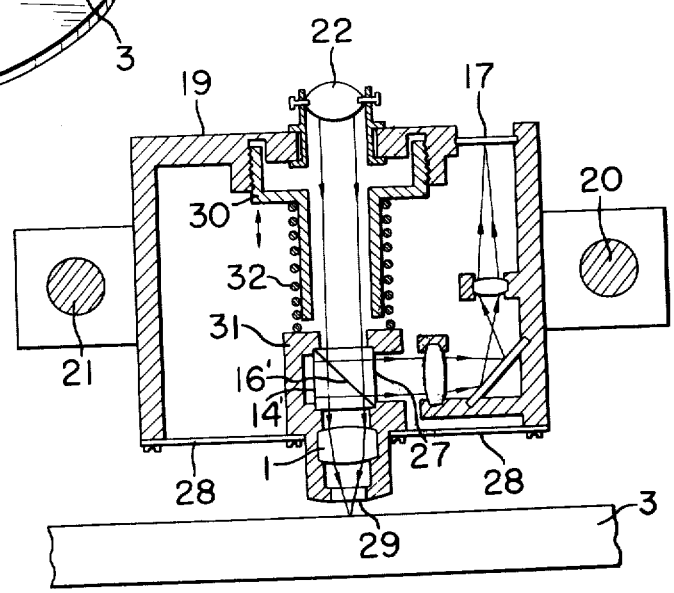

3,905,703

METHOD FOR ADJUSTING AN OPTICAL SYSTEM IN AN APPARATUS FOR RECORDING SIGNAL LIGHT BEAMS ON A PHOTOSENSITIVE BODY

BACKGROUND OF THE INVENTION

1. Field of the Invention

The invention relates to a method for adjusting the focus of an optical system, which focuses signal light beams on a photosensitive body, in an apparatus for recording the signal light beams on the photosensitive body, and for adjusting the vertical position between said optical system and said photosensitive body.

2. Description of the Prior Art

A recording system has recently been proposed, in which a crystalline element such as Kerr cell is arranged in the path of coherent light fluxes such as laser beam, said crystalline element being controlled by an electric signal such as video signal to effect amplitude modulation on said coherent light fluxes, whereby said coherent light fluxes thus modulated are condensed, for recording, on the substantially traveling photosensitive body making use of the optical system.

Another recording system has also been proposed, in which a deflecting system is arranged in the path of coherent light fluxes such as laser beam, said deflecting system being controlled by an electric signal such as video signal, whereby said coherent light fluxes are deflected in response to said electric signal and are recorded on the substantially traveling photosensitive body making use of the optical system.

A still another recording method has been proposed, in which recording is accomplished in a condition with the photosensitive body fixed making use of both systems described above.

Details of these systems are described in Germany, Offenlegungsschrift Nos. 2038453, 1574489, 2038874, etc.

SUMMARY OF THE INVENTION

In these recording systems as described above, however, the condensing point (The term "condensing point" as used here does not always mean "point", but may include a linear image or area.) of the coherent light fluxes modulated must accurately be positioned on the photosensitive body. That is, adjustment of the focus must be made. Further, it is desired that the light entering the optical system is in parallel with the optical axis of the optical system.

The method in accordance with the present invention enables one to adjust the focus and to adjust the position by causing a wave surface, which is reflected from a condensing point on the photosensitive body and inversed again to the optical system, to be interfered with a wave surface coherent with the firstly mentioned wave surface, and then observing and measuring interference fringes produced by the interference thereof.

It is therefore an object of this invention to provide a method for adjusting an optical system in an apparatus for recording signal light beams on a photosensitive body.

BRIEF DESCRIPTION OF THE DRAWINGS

In the drawings:

FIGS. 1–3 are views for explaining an interferometer applicable to the method of this invention.

FIGS. 4 (a) and (b) are views for explaining another interferometer applicable to the method of the invention.

FIGs. 5–7 illustrate a shearing element used in connection with FIG. 4 (a).

FIG. 11 is a view similar to FIG. 10 but using a plane mirror in replacement of a corner cube in the second embodiment.

FIGS. 12 and 13 are detail views showing the recording apparatus provided with the optical system according to the invention.

FIG. 14 is an enlarged vertical sectional view of the head member of FIG. 12.

DETAILED DESCRIPTION OF THE PREFERRED EMBODIMENTS

Figure 8:
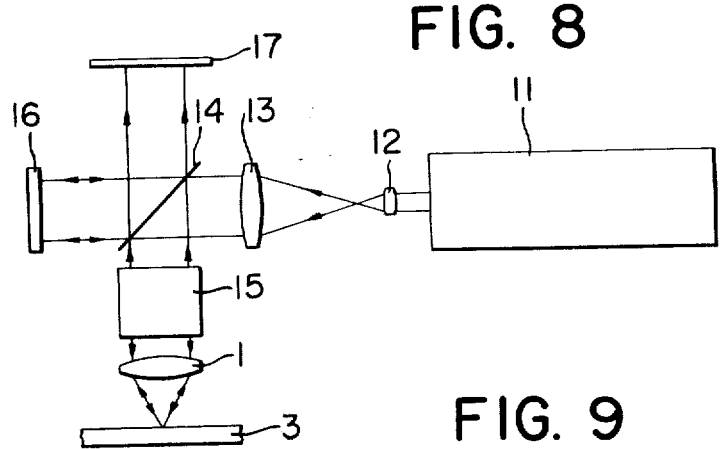
FIG. 8 shows a first embodiment of the invention.
Figure 9:
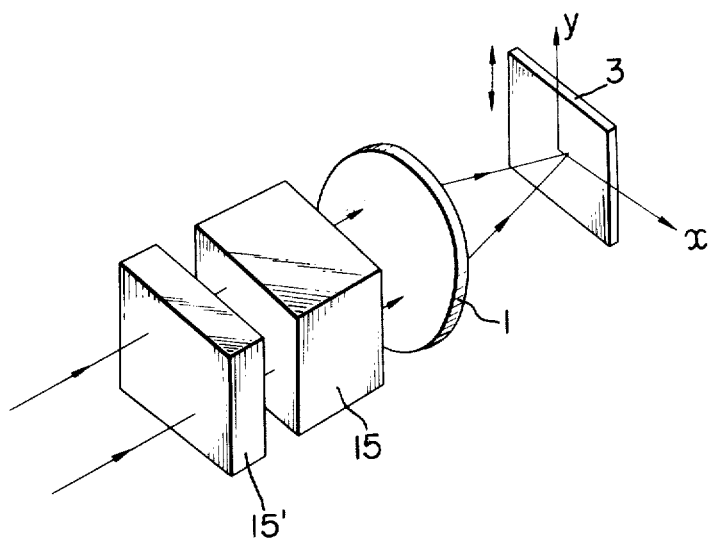
FIG. 9 shows an alternate embodiment of FIG. 8.

FIG. 1 illustrates an interferometer applicable to an embodiment of the invention. This interferometer is well known as a principle of a Twyman's lens interference measuring instrument.

Referring to FIG. 1, the optical system 1 is provided to concentrate coherent parallel light beams 2 such as laser light beams or the like on a fine spot 4 on a recording medium 3. At this time there are light beams reflected from the recording medium 3. Adjustment of the optical system can be made by making use of said reflected light beams, according to this invention. That is, the light fluxes reflected from the recording medium 3 are again incident on the optical system 1 (hereinafter called lens 1). In this case, if the condensing point 4 is accurately positioned on the surface of the recording 3, the light fluxes reflected by the surface of the recording medium 3 will return back along the same path which they followed at the time of recording. As a result, after the light has passed through the lens 1 in a reverse direction, the exactly same light flux as the incident light flux 2, that is, parallel light beams in this case are obtained. However, in case the surface of the medium 3 is displaced from the condensing point 4, the wave surface emitted from the condensing lens 1 in the reverse direction becomes a converging light beam or a diverging light beam, that is, a spherical wave. The radius of curvature R of said spherical wave is determined by focal distance f of lens and displacement d of the condensing point 4 from the surface of the medium. This gives $$R = f^2/2d \qquad (1)$$

It will be therefore understood that adjusting the focus of the optical system 1 may be accomplished by checking the shape of a wave surface emitted from the lens 1 in the reverse direction. According to the invention, an interferometer is combined with the optical system 1 to check the shape of a wave surface emitted from the optical system 1 in the reverse direction for adjusting the focus of the optical system 1 or for adjusting the relative position therebetween. As for such combination, there are two kinds of the interferometer to be combined, as hereinafter described. One of those interferometers is of the type in which the wave surface emitted from the lens 1 in the reverse direction and another plane or spherical reference wave surface are superimposed to form the interference fringes. In case the focus of the optical system is adjusted, the interference fringes become uniform in the whole field of vision as shown in FIG. 2, while in case the focus is inaccurately adjusted, the interference fringes are concentrically appeared as shown in FIG. 3. Accordingly, adjusting the focus of the optical system may be accomplished by adjusting the relative position between the lens 1 and the medium 3 so as to have uniform interference fringes over the whole field of view. In this case, the precision of adjusting the focus is obtained in the following manner. The displaced length $p$ of the light path of the spherical wave of radius of curvature R emitted from the lens 1 from the plane wave in the periphery of the lens of radius $a$ is given by $$p = \frac{a^2}{2R} \quad (2)$$

When the focal distance of the lens 1 is $f$, and numerical aperture is F, thus $$F = \frac{f}{2a} \quad (3)$$

From equations (1), (2), and (3),
$d = 4 F^2 p$
Assuming now that detection of the state of focus can be made until interference fringes of ½ fringe appear in the periphery of the lens in the form of interference fringes. The following is obtained.

$$p = \frac{\lambda}{2} \text{(where } \lambda \text{ is a wave length)} \quad (5)$$

This equation may be written, by substituting it by equation (4), in the form
$d = 2 \pi F^2$ (6)

As for example, when $\lambda = 5000$ A., $F = 0.52$, the precision of adjusting the focus is 0.27 $\mu$m. As is be evident from the example as described, adjusting the focus of extremely high precisions may be attained in accordance with the invention.

As another interferometer to be combined with the optical system 1, there is a lateral shearing interferometer. This interferometer is of the type in which a wave surface emitted from a writing-in lens 1 in the reverse direction is divided into two wave surfaces as indicated by 5 and 6 respectively, as shown in FIG. 4 (a), which are laterally displaced each other to effect interfering. In this instance, in a case the adjustment of focus is properly effected, the interference fringes 7 become uniform, while in case the adjustment is improper, parallel interference fringes perpendicular to the direction of lateral displacement as shown in FIG. 4 (b) appear. As for elements for dividing the wave surface into two wave surfaces as described and laterally displacing those wave surfaces as mentioned, there are provided a Savart's plate 8 as shown in FIG. 5, Wollaston prism 9 as shown in FIG. 6, and a parallel plane plate 10 as shown in FIG. 7.

A first embodiment of the invention will now be described with reference to FIG. 8.

The system of the first embodiment comprises three sub-systems optically connected one another. That is, the system comprises a coherent light source sub-system including a coherent light source 11 such as laser light source and beam expander optical systems 12 and 13, a writing-in and interference sub-system including a beam splitter 14, which divides a coherent light beam from the coherent light source into two light fluxes, namely, a reflection light flux and a penetration light flux, means 15 (for example, a member for effecting amplitude modulation on light fluxes such as electric shutter, liquid crystal etc., or a member such as deflector for deflecting a condensing point in response to an electric signal so as to cross in a traveling direction of the photosensitive body 3) for converting one light flux (light flux reflected) divided by the beam splitter 14 into a signal light flux corresponding to an input electric signal, an optical system for condensing the signal light flux on the photosensitive body 3, and mirror means 16 for directing the other light flux divided by the beam splitter 14 toward an interference surface 17, and a photosensitive body sub-system including a photosensitive body 3 condensing said signal light fluxes and drive means (not shown) for traveling said photosensitive body 3 at a predetermined speed.

The operation of the embodiment as described above is in the following. The coherent light flux from the light source is expanded by means of beam expanders 12 and 13. The light flux thus expanded is divided into two light fluxes by a beam splitter 14. One light flux thus divided which is, in the figure, the light reflected by the beam splitter 14, is converted into a signal light beam by converting means 15 for converting into the signal light beam. This signal light beam is condensed on the photosensitive body 3 by the condensing optical system 1. The light beam condensed on the photosensitive body 3 is recorded on the photosensitive body 3 and reflected to direct to the interference surface 17 through the condensing optical system 1, means 15, and beam splitter 14. On the other hand, another light flux (light passing through the beam splitter 14) divided by the beam splitter 14 is reflected by the mirror 16 and beam splitter 14 and directed to the interference surface 17. Two light fluxes interfere at the interference surface, and the focus and displacement of an optical axis may be adjusted by observing the interference fringes thereat in a manner as previously described.

In a case the shearing interference method is employed, it is desired that the shearing member as previously described is interposed between the beam splitter 14 and the interference surface 17. In this case, one of the wave surfaces functions as a reference wave surface.

Although the first embodiment describes the type in which the photosensitive body 3 is traveled with respect to the writing-in and interference sub-system, it is understood that the beam may be moved in a y direction while being deflected in an x direction by means of a deflector 15', with said writing-in and interference sub-system and the photosensitive body 3 fixed.

Figure 10:
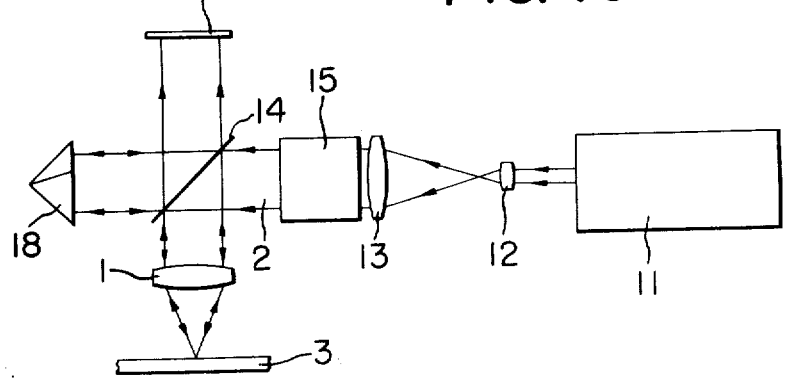
FIG. 10 shows a second embodiment of the invention.

In the first embodiment as shown in FIG. 8, after the coherent light flux from the coherent light source 11 has been divided by the beam splitter 14, one light flux is converted into the signal light flux, while in the second embodiment shown in FIG. 10, after the coherent light beam from the coherent light source 11 has been converted into the signal light flux, the light flux is divided by the beam splitter 14 into two light fluxes. This system is advantageous in the case said means 15 for converting into signal light flux is provided independently of the writing-in and interference means because said converting means is relatively heavy.

The second embodiment will now be described referring to FIG. 10. A light flux emitted from the laser light source 11 is introduced into the beam expander optical system comprising lenses 12 and 13 to expand the light flux, which is incident on the light beam deflector 15. The light flux 2, whose traveling direction is deflected by said light beam deflector 15, is divided into two light fluxes by the beam splitter 14. One light flux thereof is incident on the writing-in lens 1, and is condensed on the surface of the recording medium for recording an image. A part of said image recording light flux is reflected at the surface of the medium 3 and if the focus of the writing-in optical system is accurately adjusted, said light flux completely moves in the reverse direction and reaches again the beam splitter 14. Another light flux divided into two light fluxes is reflected by a corner cube 18 and reaches the beam splitter 14 in a manner different from that of the previous embodiment shown in FIG. 8. The reason why the corner cube is employed instead of the plane mirror as appeared in the previous embodiment will be explained. The optical arrangement of the lens 1 and the medium 3 forms so-called cat's eye optical system, wherein the directions of incident light flux and emitted light flux are always the same regardless of the incident direction of the incident light flux. Consequently, the light flux reaching the beam splitter 14 returning through the optical system 1 when the traveling direction is changed by the light beam deflector 15 travels in the same direction as that emitted from the light beam deflector 15 as shown in FIG. 11. However, the light beam which passes through the splitter 14 is different from the foregoing, that is, if in this embodiment, the plane mirror 16 is used similarly to the previous embodiment in replacement of the corner cube 18, the light flux reflected by the plane mirror 16 and reaching the beam splitter 14 as shown in FIG. 11 is different in its traveling direction from the light flux returned by the optical system 1. That difference of the traveling directions depends upon an angle of deviation, and if the angle of deviation is zero (0), two light fluxes will coincide. Therefore, the interference fringes formed by these two light fluxes always vary with the angle of deviation of the light beam deflector 15, thus disabling the adjustment of the focus. However, if the corner cube 18 is used as seen in the present embodiment, the light flux reflected from the corner cube is always in the same direction as the incident light flux, thus being always in the same as the light flux from the writing-in optical system. As a result, stabilized interference fringes can always be observed on the screen 17 even if the traveling direction of the light flux is changed by the light beam deflector 14. In replacement of the corner cube 18, cat's eye optical systems 1 and 3 may be employed as shown in FIG. 11.

As described above, the second embodiment according to the invention relates to an optical system for placing the light beam deflector 15 frontwardly of the interferometer optical system, characterized in that a reference light flux reflecting mirror of interferometer comprises a reversibly traveling reflecting mirror such as corner cube or cat's eye. Further, even in case of placing a light modulator, instead of a light beam deflector, forwardly of the interferometer, the second embodiment is applicable, and in such a case, stabilized interference fringes can be provided even if the interferometer portion is inclined.

Further detailed embodiments to which the adjusting method of the invention is applied will now be described with reference to FIGS. 12, 13, and 14.

A device for making video record original plates is shown in FIGS. 12 and 14, said device being constructed in such that a head (FIG. 14) 19 including a lens 1, FIG. 14, is disposed on the surface of a photosensitive body 3 uniformly rotating at a high speed, and said head 19 is movable in a radial direction of the rotation by means of a feed screw 20 and a rail 21. A writing-in light flux 2 impinges on the writing-in head 19 through the reflecting mirror 22 mounted on the top of the head. This writing-in light flux 2 is transmitted, after emitted from the laser light source 11, successively in order of deflector plate 23, $\lambda/4$ phase plate 24, variable concentration filter 25, light modulator 15', cylindrical lens 26 for beam expanders 12 and 13, and the like. The deflector plate 23 and $\lambda/4$ phase plate 24 constitutes a back-talk prevention optical system which prevents generation of noise so-called back-talk caused by the light flux reflected from the interferometer of the invention and returning again to the laser. The variable concentration filter 25 is provided to vary the concentration in synchronization with movement of the head 19 in order to prevent over-exposure resulted from the fact that as the head 19 moves toward the center of the recording medium disc 3, the relative speed between the lens 1 and the medium 3 becomes slow. The light modulator 15' is to effect amplitude modulation by cutting the laser light fluxes by aid of a signal. The light flux subjected to amplitude modulation is expanded by the beam expanders 12 and 13 and is incident on the cylindrical lens 26. This cylindrical lens 26 is to form a writing-in light flux in the form of a linear image on the light medium 3 and is disposed in such a direction that the light fluxes are expanded in the radial direction of the medium disc 3. As a result, a pattern 33 as shown in FIG. 13 is recorded on the medium disc 3. Spaces between said linear images are determined by electrical signals inputed into the light modulator 15.

The internal construction of the head 19 will now be described referring to FIG. 14. The light flux 2 taken into the middle portion of the head 19 by the reflecting morror 22 is incident on the prism 27. This prism 27 is integrally formed by a mirror 14' and a mirror 16' for the reference light flux. This half mirror 14' is different in its direction of inclination from that of the half mirror 14 shown in FIG. 11. Consequently, the light flux from the reflecting mirror 22 is reflected by this half mirror 14' to the direction of the screen 17. On the other hand, the light which passes through the half mirror 14' is directed to the lens 1 to form a spot on the light medium 3. The light from this so formed spot returns to the lens 1, and is reflected by the half mirror 14' in the direction of the mirror 16'. It is further reflected by the mirror 16', transmitted through the half mirror 14', and finally directed to the screen 17. The half-mirror 14', mirror 16' and lens 1 are required to be integrally formed for the reasons not only to provide a compact optical system but also to stabilize the interference fringes when writing-in is carried out in a moving condition as in the present embodiment. If parts of the interferometer are integrally formed and made in stationary as described, it becomes impossible to adjust the shape of the interference fringes, so-called tilt adjustment. In order to make tilt adjustment of the interference fringes, this embodiment provides an adjusting mechanism on the reflecting mirror 22 so that inclination of the light flux incident on the prism 27 may slightly be varied. The clearance in dynamic condition between the lens 1 and the recording medium 3 is stably maintained by virtue of the balance between a downward biasing force of a leaf spring 28 and buoyancy provided, by the air flow occurred by the high speed rotation of the recording medium, for the convex surface of the interferometer and writing-in system integrally formed facing to the recording medium 3. In this case, if a portion below the lens 1 where the light fluxes pass is open in the form of a hole, turbulence is occurred therein to adversely affect stability, so that it is desired to place a transparent plate 29 therein. The provision of the transparent plate 29 therein naturally worsens an aberration condition of the writing-in optical system, and therefore it may be desirable to design the lens 1 in consideration of the transparent plate 29 in advance. Adjusting the focus of the optical system 1 may be accomplished by varying pressure of a spring 32 mounted between members 30 and 31 by rotating said member 30 to be vertically moved. Accordingly, the optical system 1 may be adjusted by rotation of the member 30 while viewing the interference fringes that can be observed on the screen 17. The relative positional deviation between the incident light flux 2 and the reflecting mirror 22 caused by movement of the head 19 can be eliminated by bringing the light flux 2 incident on the head 19 in parallel to the moving direction of the head 19.

As is evident from the foregoing description, the present invention is concerned with the method for adjusting the optical system when in recording, but in a case the signal recording and the adjustment of the optical system are separately performed, the focus adjusting light beam would become noise relative to the image. In order to avoid this the following method is advisable to use. One method is such that in a case the recording medium is a photosensitive body, a light beam of wave length to which photosensitive body is not in sensitive is used as a focus adjusting light beam to adjust the focus. For example, in a case the photosensitive body is a photoresist, it is preferable to use a blue light beam as a writing-in light beam and to use a yellow or red light beam as a focus adjusting light beam. A second method is advantageous in a case there is an image signal only in a one direction as shown in FIG. 13. In this case, a focus adjusting light beam is slightly titled in a direction perpendicular to the direction of image alignment with respect to the signal light flux, and a cavity 34 for the focus adjusting light beam is desired to be provided beside the signal image.

I claim:

1. A method for detecting the state of focus of a coherent light beam focused onto an object plane, comprising the steps of focusing a coherent light beam on the object plane by using a focusing optical system, directing a wave front reflected from the object plane back through the focusing optical system to an interference surface, directing a reference wave front coherent and coincident with said wave front to said interference surface to form an interference fringe pattern on the interference surface, and detecting the pattern of the interference fringes and the state of focus of the coherent beam focused onto the object plane.

2. A method according to claim 1, wherein said coherent light beam is divided into two light fluxes by means of a beam splitter, one of said coherent light fluxes divided is focused on the object plane by said focusing optical system, and the other coherent light flux is directed as a reference wave front to said interference surface.

3. A method according to claim 1, wherein said reference wave front comprises a wave front obtained by a shearing element laterally displacing said inversed wave front.

4. A method according to claim 3, wherein said element comprises a Savart's plate.

5. A method according to claim 3, wherein said element comprises a Wollaston prism.

6. A method according to claim 3, wherein sand element comprises a parallel plane plate.

7. A method for detecting the state of focus of a signal light beam focused onto a photosensitive body comprising the steps of dividing a coherent light flux from a coherent light source by means of a beam splitter into two light beams, directing one of the light beams divided by said beam splitter to means for converting said one of the light beams into a signal light beam corresponding to an input electric signal, focusing the signal light beam from said means on the photosensitive body making use of a focusing optical system, directing a wave front reflected at a focusing position on the photosensitive body back through said optical system to an interference surface, directing another light beam divided by said beam splitter as a reference wave front which is coherent and coincident with said wave front to said interference surface, and observing interference fringes appearing on the interference surface.

8. A method according to claim 7, wherein said coherent light source comprises a laser tube.

9. A method according to claim 7, wherein said means comprises a member for effecting amplitude modulation on said one of the light beams.

10. A method according to claim 7, wherein said means comprises a member for deviating a focusing point of said one of the light beams on the photosensitive body.

11. A method for detecting the state of focus of a signal light beam focused onto a photosensitive body comprising the steps of directing a coherent light flux from a coherent light source to means for converting said coherent light flux into a signal light flux corresponding to an input electrical signal, dividing a signal light flux from said converting means into two light fluxes by means of a beam splitter, focusing one of said light fluxes divided into two light fluxes by the beam splitter on the photosensitive body making use of a focusing optical system, directing a wave front reflected at a focusing position on the photosensitive body back through said optical system to an interference surface, directing another light flux divided by the said beam splitter as a reference wave front which is coherent and coincident with said wave front to said interference surface and observing interference fringes appearing on the interference surface.

12. A method according to claim 11, wherein said means comprises a member for effecting amplitude modulation on the coherent light flux.

13. A method according to claim 12, wherein said means comprises a member for deviating a focusing point of said coherent light flux on the photosensitive body.

14. A system for detecting the state of focus of a signal light beam focused on a photosensitive body including a light source sub-system having a coherent light source; a writing-in and interference sub-system optically connected to said light source sub-system, said writing-in and interference sub-system comprising (a) a beam splitter for dividing a coherent light beam from the light source subsystem into two light fluxes, (b) means for converting one of the light fluxes divided by said beam splitter into a signal light flux corresponding to an input electric signal, (c) a focusing optical system for focusing signal light fluxes on a photosensitive material, and (d) an interference surface to which a wave front reflected front a focusing position on the photosensitive material back through said optical system and the other light beam divided by said beam splitter are directed and where both wave fronts are made coherent and coincident to form an interference fringe pattern on said interference surface; and a photosensitive material sub-system including said photosensitive material for recording said focused signal light fluxes and means for moving said photosensitive material at a predetermined speed.

15. A system according to claim 14, wherein said means for converting the light flux in said writing-in and interference sub-system into a signal light flux corresponding to an input electric signal comprises a member for effecting amplitude modulation on the light flux.

16. A system according to claim 14, wherein said means for converting the light flux in said writing-in and interference sub-system into a signal light flux corresponding to an input electric signal comprises a member for deviating said focusing point so that it may cross the moving direction of the photosensitive body on the surface of the photosensitive body in response to said electric signal.

17. A system according to claim 14, wherein said coherent light source in the light source sub-system comprises a laser light source.

18. A system for detecting the state of focus of a signal light beam focused on a photosensitive body including a light source sub-system having a coherent light source; a writing-in and interference sub-system optically connected to said light source sub-system, said writing-in and interference sub-system comprising (a) means for converting a coherent light beam from the light source sub-system into a signal light flux corresponding to an input electric signal, (b) a beam splitter for dividing the signal flux into two light fluxes, (c) a focusing optical system for focusing signal light fluxes on a photosensitive material, and (d) an interference surface to which a wave surface reflected from a focusing position on the photosensitive material back through said optical system and the other light beam divided by said beam splitter are directed, and where both wave fronts are made coherent and coincident to form an interference fringe pattern on said interference surface, and a photosensitive material sub-system including said photosensitive material for recording said focused signal lignt fluxes and means for moving said photosensitive material at a predetermined speed.

19. A system according to claim 18, wherein said coherent light source in the light source sub-system comprises a laser light source.

20. A system according to claim 18, wherein said means for converting the the flux in said writing-in and interference sub-system into a signal light flux corresponding to an input electric signal comprises a member for effecting amplitude modulation on the light flux.

21. A system according to claim 18, wherein said means for converting the light flux in said writing-in and interference sub-system into a signal light flux corresponding to an input electric signal comprises a member for deviating said focus point so that it may cross the moving direction of the phhotosensitive body on the surface of the photosensitive body in response to said electric signal.

* * * * *

UNITED STATES PATENT OFFICE
CERTIFICATE OF CORRECTION

Patent No. 3,905,703          Dated September 16, 1975

Inventor(s)    KAZUYA MATSUMOTO

It is certified that error appears in the above-identified patent and that said Letters Patent are hereby corrected as shown below:

Column 1, line 32, "A still" should read --Still--;

Column 2, line 13, "detail" should read --detailed--;

Column 2, lines 35 and 36, "recording 3" should read --recording medium 3--;

Column 2, line 40, "the exactly same" should read --exactly the same--;

Column 3, lines 3 and 4, "are concentrically appeared" should read --concentrically appear--;

Column 3, line 37, "$\pi$" should read -- $\lambda$ --;

Column 3, line 40, "As is be evident" should read --As is evident--;

Column 3, line 50, "each other" should read --with respect to each other--;

Column 3, line 51, "in a case" should read --when--;

UNITED STATES PATENT OFFICE
CERTIFICATE OF CORRECTION

Patent No. 3,905,703   Dated   September 16, 1975

Inventor(s)   KAZUYA MATSUMOTO

It is certified that error appears in the above-identified patent and that said Letters Patent are hereby corrected as shown below:

Column 3, line 65, "connected one another" should read --connected to one another--;

Column 4, line 45, "In a case" should read --In the case when--;

Column 5, line 51, "in the same" should read --in the same direction--;

Column 6, line 8, "in such" should read --in such a manner--;

Column 6, line 21, "constitutes" should read --constitute--;

Column 6, line 27, "resulted" should read --resulting--;

Column 6, line 46, "morror" should read --mirror--;

Column 6, lines 65 and 66, "in stationary" should read --stationary--;

Column 7, lines 35 and 36, "in a case" should read --in case--;

Column 7, line 40, "in a case" should read --in case--;

UNITED STATES PATENT OFFICE
CERTIFICATE OF CORRECTION

Patent No. 3,905,703    Dated September 16, 1975

Inventor(s) KAZUYA MATSUMOTO

It is certified that error appears in the above-identified patent and that said Letters Patent are hereby corrected as shown below:

Column 7, line 42, "length" should read --length,--; "which" should read --which the--; "in" should read -- in- --;

Column 7, line 43, "sensitive" should read --sensitive,--;

Column 7, line 48, "a case" should read --case--;

Column 9, line 15, Claim 14, "front" (second occurrence) should read --from--;

Column 10, line 22, Claim 18, "lignt" should read --light--;

Column 10, line 28, Claim 20, --the the-- should read --the--.

Signed and Sealed this seventeenth Day of February 1976

[SEAL]

Attest:

RUTH C. MASON
Attesting Officer

C. MARSHALL DANN
Commissioner of Patents and Trademarks